Sept. 9, 1952 E. WOLF 2,610,244
DEPTH SOUNDING APPARATUS
Filed June 5, 1945 4 Sheets-Sheet 1

FIG.1

INVENTOR.
Ezekiel Wolf
BY

FIG. 2

Sept. 9, 1952 — E. WOLF — 2,610,244

DEPTH SOUNDING APPARATUS

Filed June 5, 1945 — 4 Sheets—Sheet 4

INVENTOR.
BY

Patented Sept. 9, 1952

2,610,244

UNITED STATES PATENT OFFICE 2,610,244

DEPTH SOUNDING APPARATUS

Ezekiel Wolf, Dorchester, Mass., assignor, by mesne assignments, to Raytheon Manufacturing Company, a corporation of Delaware Application June 5, 1945, Serial No. 597,681

27 Claims. (Cl. 177—386)

The present invention relates to a distance measuring system and more particularly to a system for visually indicating and recording distances and depths in particular in an aqueous medium for depth sounding.

The present invention contains many advantageous features but its general aim is to provide a depth sounding system in which a broad range of depths may be obtained both for brief visual indications and for a permanent record.

In the present invention the actual recording scale is comparatively long but is separated into sections automatically chosen by the position of a hand dial without calling upon the operator to do any more than merely to note whether any record of depth has been made.

The scale in the form described in the present specification is divided into four sections covering the entire range for which the system is devised. Division may be made in any other number of sections which may be desired with the same general operating scheme and arrangement as herein contained. In the present invention both visual indications and recorded records are produced, the visual indications corresponding to that of the permanent record with the scale for the visual indications being similarly divided as the scale for the written record and also being simultaneously controlled for proper choice of the section of the scale by the same automatic arrangement as is used in connection with the recording of the depths.

The present invention is particularly adapted for depth sounding with the use of either high frequency or low frequency compressional waves or impact oscillating elements and employs the principle of producing the signal to be transmitted at the beginning of the time interval to be measured corresponding, except for adjustments, to a zero position on the scale.

The means for accomplishing this result and providing the other advantages of the invention, some of which have been mentioned above, will be more fully and readily understood on consideration of the specification of the invention annexed hereto and taken in connection with the drawings showing an embodiment of the same in which:

Figure 1:
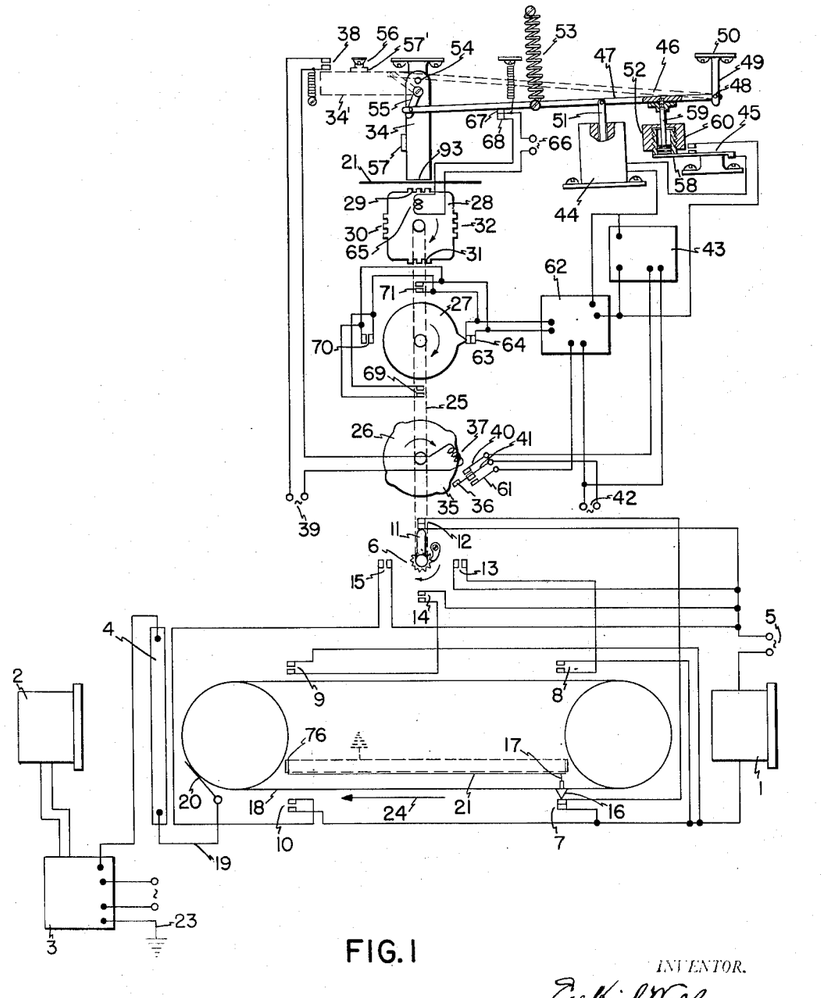
Fig. 1 shows a general layout of the invention.

In the general system as indicated in Fig. 1, the transmitted signal may be of the compressional wave type transmitted by a projector 1 undamped by intermittent oscillator signals or as an impact signal and it may be either directive or non-directive, whichever may be desired. 2 indicates a receiver for receiving the echo reflected from the bottom which was transmitted from the projector 1. 3 is an amplifying device for amplifying the received signal and 4 is a visual indicator which may be of the discharge type described in the United States Patent No. 1,667,540. This indicator, however, is elongated and extends substantially behind the complete length of section of scale for which the visual indicator is to serve. This will be explained more fully in connection with the discussion of Figs. 2, 3 and 4.

In Fig. 1 the projector 1 may be energized through alternating current source 5 the operation of which is controlled through the sectional range selector switch 6 and the keying contacts 7, 8, 9 and 10. The selector switch arm 11 of the switch 6 may select one of four groups of contacts 12, 13, 14 or 15, thus applying the power source 5 selectively to either of the keying contacts 7, 8, 9 or 10, respectively. Keying is effected by the keying cam 16 which has relatively the same position as the indicating stylus 17, both carried by the belt 18 which also provides the visual indication, as will be disclosed later. The keying cam 16, as indicated in Fig. 1, has already closed the contacts 7 while the switch arm 11 has closed the contact 12. Thus at the instant indicated in Fig. 1 the projector 1 is transmitting a signal and at an instant later the keying cam 16 will have passed beyond the contact 7 and the signal will have ended. The contact 7 may, of course, control a secondary relay or keying device for producing a shorter or a longer signal if this is necessary.

The echo received by the receiver 2 will be visually produced on the long neon tube 4 and also by the marking of the stylus 17 on a recording paper as this stylus passes over the paper. The electrical circuit for this is tied in series with the neon tube 4 and is effected through the conductor 19, the contact brush 20, the conducting belt 18, the recording paper 21 and the grounded roll 16 from which the circuit is returning to the ground 23 on the amplifier.

If the switch arm 11 had been turned to a position to close the contact 13, then the keying contacts for operating the system would be changed to the contacts 8 and therefore, as the belt 18 is moving in the direction of the arrow 24, the contact 8 would be closed prior to the time that the stylus 17 comes to the position shown in Fig. 1. Under these conditions the signal would have been transmitted an interval of time corresponding to that needed for the stylus to travel from a position adjacent the contacts 8 to the beginning of the recording paper, and therefore the depth recorded in the same section of the recording paper would be deeper than that recorded when the switch arm 11 closed the contact 12. This interval extends over the initial scale section and, by moving the arm 11 to the position of contacts 13, the first scale section is replaced by the second scale section. In a similar fashion the third section of the scale is used when the switch arm 11 closes the contact 14 and as a result the contacts 9 become the keying cam. The final section of the scale is used when the cam arm 11 closes the contacts 15 and the contacts 10 serve as the keying contacts. The switch arm 11 is carried by the shaft 25 which simultaneously turns not only the switch arm 11 but also the cams 26, 27 and the scale recorder cam 28. The elements 26, 27 and 28 control the establishment of the proper scale selection.

In the present system the scale is in a number of sections equal to the number of keying contacts and each change or switch position, namely position of the switch arm 11, presents the new scale section. For recording, the proper scale section in the present invention is printed on the recording paper, the printing cam 28 containing the type for such a scale. As indicated, there are provided four sections of type on the scale, the shallow end of the scale comprising the type 29, the next type 30, the next 31 and the last 32. This type is carried beneath the recording sheet 21 while above the recording sheet in alignment with the type is shown the inking plate 93 carried by the pivoted bracket 34 which normally is held in the dotted-line position as indicated by 34' except during the moment on which a printed record is to be produced by the type as will be described later.

The cams 26, 27 and 28 in setting for the proper range section are moved in a clockwise direction. With regard to the cam 26 it will be noted that the cam bulge 35 has passed the finger 36 but since it is presumed that the solenoid 37 has already been energized through the contacts 38, completing the circuit over the power source 39, the finger 36 will be in a raised position and contacts 40 and 41 will be together, completing the circuit through the power source 42 to the time delay relay repeater 43 which is a longtime delay relay of the order of perhaps four minutes between operation after the current has been applied and which will repeat its operation in such intervals during which the power is applied. After the time interval established by the relay 43 has expired, the relay will act to energize the solenoid 44 through the damped switch contact mechanism 45 which normally will be in a closed position as indicated by the dotted-line position 46 of the shaft 47. The shaft or arm 47 is pivoted at one end 48 to a supporting bracket 49 which may be supported from a casing or support as indicated at 50. This pivoted arm or shaft 48 has linked to it the solenoid plunger 51 engaging the solenoid 44 and through the piston 59 the dashpot 52 carrying the switch 45. A spring 53 retains the arm 47 in its upper position under normal conditions and in this position the U-shaped bracket 34 pivoted at both ends by pivots 54 is maintained in a horizontal position. The shaft 47 is connected to the bracket 34 through a toggle link 55 which offsets the joint of the shaft 47 with the link 55 from the pivot center 54 so as to permit the upward pull of the spring 53 to swing the bracket 34 clockwise to its dotted-line position indicated in Fig. 1.

As this bracket comes up to its dotted-line position, it initially closes the contacts 38 by the force of its motion but these contacts are again opened by the action of the spring 56 pressing against the side plate 57 attached at the edge of the bracket 34. When the solenoid 44 is energized, the arm 47 is pulled downward, thus drawing the bracket 34 to its full-line position shown in Fig. 1. The dashpot 52, which is supported on the spring arm 58, is not forced down until the piston 59 has built up pressure in the chamber 60. With pressure built up in the chamber 60, the spring arm 58 is forced downward, opening the contacts at 45 and thereby breaking the solenoid circuit, thus permitting the strength of the spring 53 to retract the bracket again to its dotted-line position. In doing this, as has been previously stated, the contact 38 is closed, thus energizing the solenoid 37 and closing the contacts 40 and 41 if these are not previously closed. Power will therefore again or still be applied to the relay 43 through the line 42 and the printing of the scale will again take place at the proper time interval. This interval is so timed that the recording paper 21 will have moved substantially a distance corresponding to the portion of the record which remains visible so that there will always be on the recording chart a printed record of the scale to which the indications are referred.

Initially, when the shaft 25 has been turned, the cam projection 35 of the cam 26 will depress the finger 36 and make contact between the contacts 41 and 61. This will apply power to the relay 62 from the power source 42 and, therefore, when the cam finger 63 closes the relay contact 64, the relay 62 will operate after its selected time delay which is usually of a short time duration, perhaps 10 to 20 seconds. During this interval a record will be made of the depth if the right scale has been chosen and if not the operator will turn the shaft 25 further to a different section of the system until he obtains a sounding record. If a sounding record is obtained, the setting will be left in its proper position and a proper record will be produced. If a sounding record is obtained after the operator has left the selector arm in a position for a number of seconds, then the action of the relay 62 will also operate the solenoid and produce the same printing of the scale as previously described. However, when the contact 38 is closed, the contact finger 36 will be drawn upward to complete the contact between the contacts 40 and 41, thus placing in operation the relay switch 43 for continued operation at the longer time intervals required to produce a printing of the scale record in continued operation.

The contact finger 36 is locked to make contact between the contacts 40 and 41 or the contacts 41 and 61. The contact between 41 and 61 is made only when the cam 26 has been turned and directly thereafter according to the time interval established by the relay 62. The recording paper 21 will be printed by the action of the type numbers 29 against the inking plate 93.

The cam 28 which carries the type 29 is raised when the bar 47 has been lowered. This is accomplished by means of the solenoid 65, the circuit of which is closed through the current supply 66 and the contacts 67 and 68, which the bar 47 brings together as the inking plate 93 swings into printing position. Directly after the relay 62 has acted and the printing of the scale has been effected, the bracket 34 and bar 47 are returned to normal, opening the circuit to the coil 65 permitting the type bar to drop back to its normal position.

It will be noted also that the cam 27 controls the operation of pairs of contacts 64, 71, 70 and 69, all connected into the initially operating relay 62 while the cam 26 as it is turned switches the supply 42 from the relay 43 to the relay 62. The relay 62 will not operate until the cam projection 63 has closed the pair of contacts 64 or, in any range position, one of the pairs of contacts 69, 70 or 71 so that, directly after a setting has been made corresponding to a selected range section, the printing of the scale will take place on the recording paper but a number of sounding measurements have been made and recorded. The belt 18 carrying the keying projection 16 will close contacts 7, 10, 9 and 8 a number of times before the scale printing is effected so that, whichever section of the range has been selected, a number of signals will be sent out and records made if the depth is within the range selected. This is necessary since the recording stylus 17 may not be on the paper 21 at the time the incoming echo is received since it is only on the paper 1/n of the time of its cycle around the belt 18 where n is the number of sections in the complete scale.

If a signal has been given by the keying of the contacts 7, the echo, in order to be recorded, will have to return before the stylus has progressed to the place occupied by the contacts 10. This is the short range. If the echo does not return in this time, then the contacts 8 should have been keyed or the contacts 9 or 10 depending upon the depth. The operator will, therefore, turn the shaft 25 rotating the selector arm 11 which will energize contacts 7 for the shallowest depth 8, for the next shallowest and so on through 9 and 10 until a record is produced by one of them. Since there are one or two or more soundings per second, the action of printing the type will be delayed through control of the operation of the relay 62 an interval of ten seconds more or less to permit a few soundings and records to be made before printing. Each setting of the cam 27 establishes a new beginning of time of action for the relay 62, since when the cam projector 63 leaves the contacts 64, 69, 70 and 71, they immediately open, thus preventing any action of relay occurring which otherwise would have taken place if the cam was permitted to remain in any one position. The operator has therefore the time of normal operation of the relay 62 within which to see if a sounding has been received. If one has been received, he leaves the selector arm at that position and, within the time of operation established by the relay 62, the printing on the range on the recording sheet 21 is effected.

The schematic circuit shown in Fig. 1 indicates the operation mainly in connection with the recording system. A scale is also selected for the visual indicator simultaneously with the selection of the proper scale for the permanent recorder. The mechanism for this and for the recording system is shown more in detail in the other figures of the application.

Figure 2:
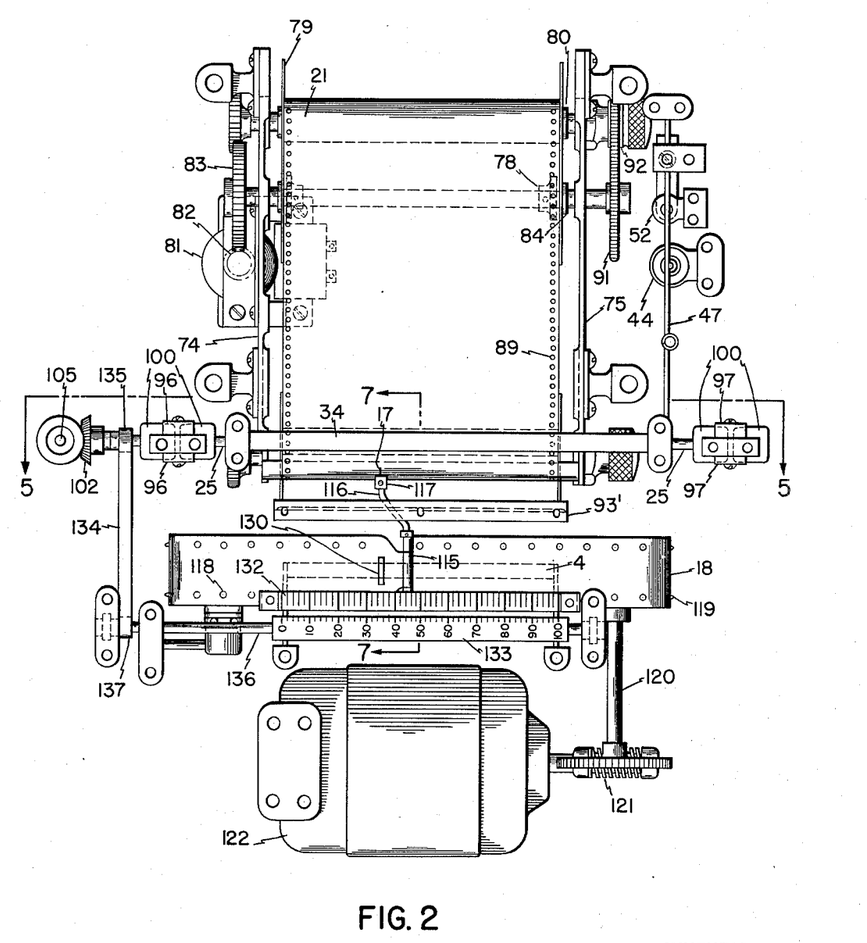
Fig. 2 shows a plan view of the recording and visual indicator with the casing therefor removed.
Figure 3:
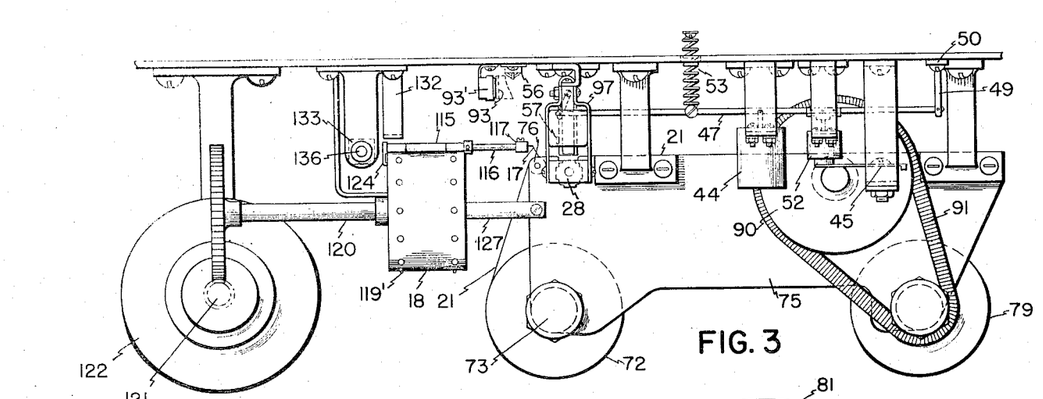
Fig. 3 shows a side view looking from the right of Fig. 2.
Figure 4:
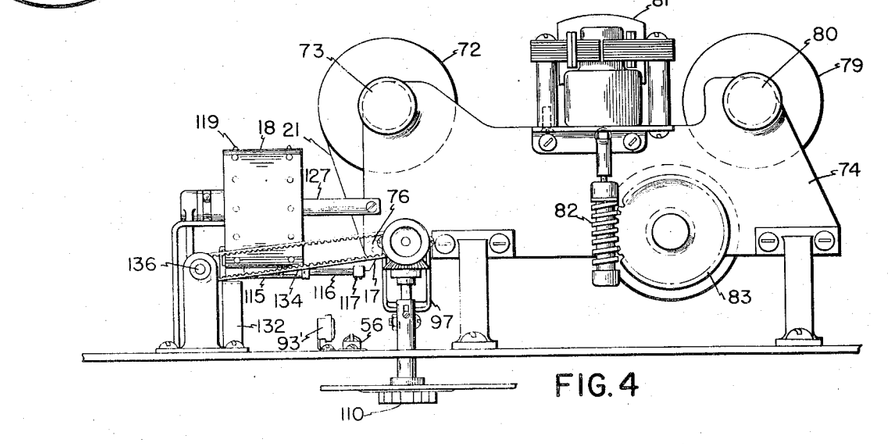
Fig. 4 shows a partial side view as seen from the left of Fig. 2.

Referring more particularly to Figs. 2, 3 and 4 the recording paper 21 is supplied from a roll 72 carried on the spindle 73 which is removably journaled in the side supporting frames 74 and 75. From this roll the paper goes over the small corner roll 76 and over the sprocket roll 78 which is the driving roll of the system and finally rewound on the rewind roll 79 which is supported by the spindle 80. Constant speed drive is obtained through the synchronous motor 81 which drives the worm wheel 82 and the worm gear 83 which is directly mounted on the drive shaft 84 carrying the sprocket gear 78 for drawing the paper by engagement in the sprocket holes 89. The shaft 84 also carries the pulley 90 which drives a spring chain 91. The spring chain 91 passes over a pulley 92 connected to the spindle 80 and drives therefore the rewind roll 79 tending to turn, but for the spring slip, at a slightly higher speed than that at which the paper is pulled so as to maintain an even tension on the paper at all times. Sufficient slip is provided by the spring pulley 91 so that a uniform tension is maintained on the paper feed.

Different but constant speeds of the motor 81 may be obtained by shifting the synchronous frequency at which the motor 81 is operated. This feature may be advantageously used since the paper drive in the present case is independent of the drive of the stylus and the keying contacts, the speeds of which must be accurately maintained corresponding to the scale which is used. When a deep portion of the scale is used, or when the recorder is to be used over long periods of time, then a low speed paper feed may be used by changing the synchronous frequency from 60 cycles to 20 or 30 cycles by switching in a different frequency supply in the system. If for some reason no record is desired, the motor 81 may be stopped and the discharge indicator system alone used.

Figure 5:
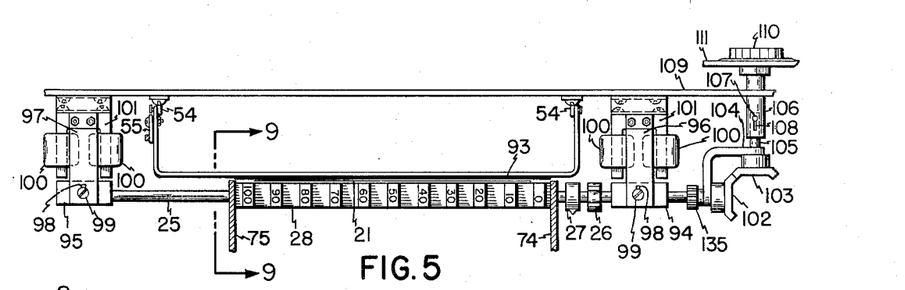
Fig. 5 shows a sectional view on the line 5—5 of Fig. 2.
Figure 7:
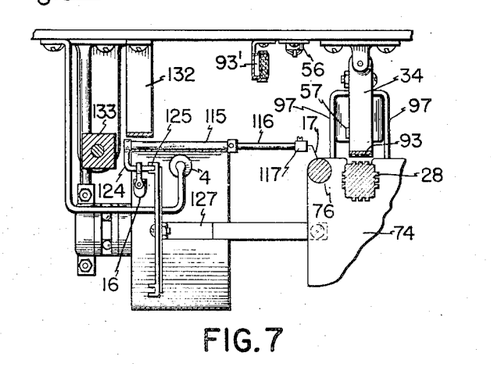
Fig. 7 is a sectional view on the line 7—7 of Fig. 2.
Figure 9:
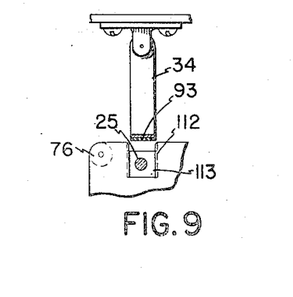
Fig. 9 is a sectional detail on the line 9—9 of Fig. 5.

The method of producing the printing of the range on the recording paper will now be described, the same reference numerals being used as those indicated in Fig. 1. Referring more particularly to Figs. 5 and 7, it will be seen that the bracket 34 extends around in a U-shape with square corners and that the inking plate 93 is maintained on the exposed face of the long portion of the bracket extending across the width dimension of the recorder. Directly beneath the inking plate 93 is the type bar 28 which is supported for free vertical motion in the side supporting brackets 74 and 75. These side supporting brackets are cut away in channels 112 (Fig. 9) in which rectangular bearing blocks 113 rest in which the shaft 25 is journaled. This construction provides guides to permit free up and down motion of the type bar and the supporting shaft which carries it. The supporting shaft 25 which carries all three cams 26, 27 and 28 also rotates freely in blocks 94 and 95 carried outside of the supporting guide. These blocks 94 and 95 are of magnetic material and are freely supported for limited vertical movement (see Fig. 5) by the fork brackets 96 and 97 each of which has two arms and is provided with slots 98, 98 through which supporting screws 99 pass, retaining the bars 94 and 95 but permitting free upward guided motion of the shaft 25 and its whole assembly.

The magnet coil indicated diagrammatically as 65 in Fig. 1 is actually comprised of the four electromagnets 100, 100, 100, 100 mounted on the arms of the cores 101, 101 which are supported by the frame. The shaft 25 as viewed in Fig. 5 has at its right end two gears, positioned at right angles with each other, 102 and 103, journaled in a right angle bracket 104. The gear 103 carries the shaft extension 105 telescoping into a sleeve 106. The shaft 105 and sleeve 106 are keyed together by means of the pin 107 attached to the shaft 105 which moves in the slot 108 formed in the sleeve 106. The sleeve 106 passes through the supporting wall 109 of the casing and has at its external end the range-setting knob 110 by which the desired range is selected and shown on the indicator dial 111. When the electromagnets 100 are energized, the magnetic blocks 94 and 95 are drawn upwards, drawing up (referring to Fig. 5) the whole assembly of the shaft 25 and everything which is attached to it including the cams 26, 27, the type bar or cam 28 and the right-angle gear assembly to the right of Fig. 5. As previously explained in connection with the explanation of Fig. 1, this occurs after the inking plate has been brought into position and the equally-balanced pull on the shaft 25 produces a printing of the scale on the paper beneath the inking plate which is the side of the paper which is viewed by the operator.

Normally, when the printing mechanism is not operating, the plate 93 is in contact with the inking pad 93' (Fig. 3) attached to the frame or casing and in a position so that its face and the face of the plate 93 are in contact with each other. In this way the inking pad is always covered and will remain fresh.

Figure 6:
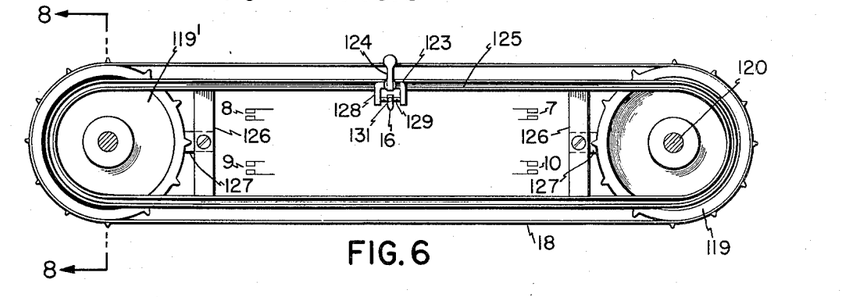
Fig. 6 shows a detail of the structure shown in plan in Fig. 2.
Figure 8:
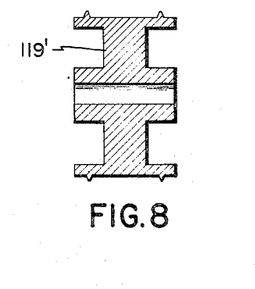
Fig. 8 is a sectional detail on the line 8—8 of Fig. 6.

The indicating mechanism for both producing a visual indicating and a permanent record is shown more particularly in Figs. 2, 3 and 4 with details being shown in Figs. 6, 7 and 8.

The endless belt 18 of Fig. 1 is shown by the same number 18 in Fig. 2. This belt is joined preferably by means of a hinged link 115, Figs. 2 and 3, in which the hinging pin 116 is extended and on which is mounted a stylus chuck 117 carrying the stylus wire 17. This stylus wire, as indicated in Fig. 3, is bent downward at an angle to bear upon the recording paper 21 as it passes over the conductive roll 76.

It will be noted that the type bar in printing comes to bear beside the roll 76 so that the marking of the range on the recording paper occurs at the beginning where the record is made. Since the inking plate is normally retracted, the recording paper will be visible from the point at which the record is made.

The endless belt 18 is provided with sprocket holes 118 meshing with the sprocket gears 119' and 119 driven by the shaft 120 through the worm wheel drive 121 by the feed control driving motor 122. The endless belt 18 also carries the keying cam assembly 123. This comprises an angle bracket 124 which is attached at one end of the pin 116 and which at its other end rides in a channel shaped guideway 125 extending all around the belt 18 but inwardly offset from it. The pin or shaft 116 may thereby be freely journaled, the angle bracket 124 serving to maintain the stylus 17 always in the proper position as it is being drawn over the corner roll 76. The guide channel 125 may be supported by brackets 126 which, in turn, are attached by arms 127 to the frame of the machine. The angle piece 124 supports a yoke 128 carrying the ends of a bar 129 on which the keying finger 16 is supported. The keying finger 16 may be adjusted in position on the arm 129 and locked by means of a set screw 131. Spaced in the path of the keying finger 16 are the keying contacts 7, 8, 9 and 10.

The neon tube indicator 4 is positioned beneath the upper flat section of the endless belt and will flash upon the receipt of an echo. The belt itself is provided with a transverse slot 130 by means of which the depth or distance reading is made. This slot and the stylus, since they are carried in relative fixed positions, provide the same indication, one a record and the other a visual mark. Just over the endless belt and positioned longitudinal of it adjacent the path of the slot is a measuring scale 132 beside which is the calibrating scale 133 which generally is marked in the same way as the type cam 28 except that the calibrated bar 133 is to be read rather than used for printing. This calibrated bar is connected by a sprocket chain 134 (Fig. 4) to the sprocket wheel 135, Fig. 5, in a one-to-one ratio so that, when the handle 110 is turned, the bar 133 is rotated with the printing bar or cam 128 and the same scale appears for the visual scale as for the printed record. This construction is more clearly seen in Fig. 2, the calibrated bar 133 being supported on the shaft 136 on which the sprocket wheel 137 is mounted with which the sprocket chain 134 meshes.

The operation of the recording system has already been described. The visual system operates correspondingly in the same way. If the distances, for instance, from zero to one hundred feet or fathom, are to be measured, then the scale zero to one hundred will be employed and the keying will take place on the keying contacts 7 at the instant that both the slot 130 and the stylus 17 are opposite the zero of the scale. If depths from one hundred to two hundred are to be measured, keying will take place on the contacts 8 before the stylus and the slot 130 have reached the zero position. If the operator should have the indicator set so that no sounding record or visual indication appears, then he will turn the knob 110 observing for a few seconds after each one quarter of a turn until a sounding is obtained. The correct scale will always be presented to whatever position the selector knob 110 has been turned. Since the paper feed motor 81 and the time motor 122 are each independently operated if it is desired to use only the visual indicator instead of providing a record, the paper feed motor may be stopped and the visual record only used.

No special description has been given of the projectors and amplifiers since any of the usual means may be employed for producing and receiving the signal by means of which the time interval and distance are measured.

Having now described my invention, I claim:

1. In a system of the echo type wherein depths or distances are measured by the time interval between the transmission of a signal and the receipts of the echo and recorded on a recording paper which is advanced in one direction, a recording stylus which is moved in a direction transverse to the motion of the paper over it, means for printing a section of a range measuring scale on the recording paper during operation of said system, means for adjusting the time of production of the transmitted signal with respect to the zero range position of the stylus on the scale and means operated in accordance with the amount of said adjustment for selecting the scale section to be printed.

2. In a system of the echo type wherein depths or distances are measured by the time interval between the transmission of a signal and the receipt of the echo and recorded on a recording paper which is advanced uniformly in one direction, a recording stylus, an endless belt carrying said stylus arranged and disposed to move the same over the recording paper in a direction transverse to the motion of the paper, means to move said belt at a desired speed, means for keying the transmitted signal at selected positions of the recording stylus with reference to the recording paper, a range measuring scale having a plurality of sections each corresponding to a certain range region, means for printing a section of said scale on the recording paper during the operation of the system, the section of the measuring scale to be printed and the choice of the keying position of the stylus with respect to the paper having a single control element arranged to choose a keying position and range section such that the range section chosen corresponds to the range region from which echoes can return while the stylus is disposed to mark the paper.

3. In a system of the echo type wherein depths or distances are measured by the time interval between the transmission of a signal and receipt of the echo and recorded on a recording paper which is advanced uniformly in one direction, by way of a recording stylus moving over the recording paper in a direction transverse to the motion of the paper, means for printing a section of a measuring scale on the recording paper comprising means having sections of the measuring scale mounted in transverse alignment with respect to the motion of the paper, means for selecting the section of the measuring scale to be printed in accordance with the range region being explored, means for keying the transmitted signal at selected positions of the recording stylus with reference to the recording paper in accordance with said range region being explored, and means operable for striking the measuring scale against the recording paper to provide a print of the selected section of the measuring scale thereon.

4. In a system of the echo type wherein depths or distances are measured by the time interval between the transmission of a signal and receipt of the echo and recorded on a recording paper which is advanced uniformly in one direction, by way of a recording stylus moving over the recording paper in a direction transverse to the motion of the paper, means for printing a section of a measuring scale on the recording paper comprising a shaft having a plurality of flat faces on each of which the type of a section of the measuring scale is mounted, means for selecting the section of the measuring scale to be printed in accordance with the range region being explored, means mounting said shaft transversely across said paper adjacent the face thereof, means for forcing said shaft against said paper for printing the selected section of the scale thereon.

5. In a system of the echo type wherein depths or distances are measured by the time interval between the transmission of a signal and receipt of the echo and recorded on a recording paper which is advanced uniformly in one direction, by way of a recording stylus moving over the recording paper in a direction transverse to the motion of the paper, means for printing a section of a measuring scale on the recording paper, comprising a shaft having a plurality of flat faces on each of which the type of a section of the measuring scale is mounted, means for selecting the section of the measuring scale to be printed in accordance with the range region being explored, means mounting said shaft transversely across said paper adjacent the face thereof, electromagnetic means positioned at each end of the shaft for drawing the shaft against the paper for printing the selected section of the scale thereon.

6. In a system of the echo type wherein depths or distances are measured by the time interval between the transmission of a signal and receipt of the echo and recorded on a recording paper which is advanced uniformly in one direction, by way of a recording stylus moving over the recording paper in a direction transverse to the motion of the paper, means for printing a section of a measuring scale on the recording paper, comprising a shaft having a plurality of flat faces on each of which the type of a section of the measuring scale is mounted, means for selecting the section of the measuring scale to be printed in accordance with the range region being explored, means mounting said shaft transversely across said paper adjacent the face thereof, means for forcing said shaft against said paper for printing the selected section of the scale thereon, means for keying the transmitted signal at selected positions of the recording stylus with reference to the recording paper in accordance with said range region being explored, and unitary means operable both for selecting the position of keying and the corresponding section of the scale to be printed.

7. In a system of the echo type wherein depths or distances are measured by the time interval between the transmission of a signal and the receipt of the echo and recorded on a recording paper which is advanced uniformly in one direction, a recording stylus, an endless belt carrying said stylus arranged and disposed to move the same over the recording paper in a direction transverse to the motion of the paper, means driving said belt at a desired rate, means for keying the transmitted signal at selected positions of the recording stylus with reference to the recording paper, means for printing a section of a measuring scale on the recording paper during the operation of the system, a control element manually operable for selecting the choice of the relative position of the stylus with respect to the paper and the section of the measuring scale to be printed and means delaying the action of the printing for an interval after the manual operation of said control element.

8. In a system of the echo type wherein depths or distances are measured by the time interval between the transmission of a signal and the receipt of the echo and recorded on a recording paper which is advanced uniformly in one direction, a recording stylus, an endless belt carrying said stylus arranged and disposed to move the same over the recording paper in a direction transverse to the motion of the paper, means driving said belt at a desired rate, means for keying the transmitted signal at selected positions of the recording stylus with reference to the recording paper, means for printing a section of a measuring scale on the recording paper during the operation of the system, a control element manually operable for selecting the choice of the relative position of the stylus with respect to the paper and the section of the measuring scale to be printed, means delaying the action of the printing for an interval after the manual operation of said control element, and relay means periodically operable thereafter for effecting repeated printing of said scale sections.

9. In a system of the echo type wherein depths or distances are measured by the time interval between the transmission of a signal and the receipt of the echo and recorded on a recording paper which is advanced uniformly in one direction, a recording stylus, an endless belt carrying said stylus arranged and disposed to move the same over the recording paper in a direction transverse to the motion of the paper, means driving said belt at a desired rate, means for keying the transmitted signal at selected positions of the recording stylus with reference to the recording paper, means for printing a section of a measuring scale on the recording paper during the operation of the system, comprising an inking plate, means carrying the scale sections mounted beneath the recording paper across the same, independent means operable together for first swinging said inking plate in a position over the paper and then drawing up said scale section against said paper at a position opposite said inking plate, and means operable thereafter for restoring said inking plate and scale to its normal inoperative position.

10. In a system of the echo type wherein depths or distances are measured by the time interval between the transmission of a signal and the receipt of the echo and recorded on a recording paper which is advanced uniformly in one direction, a recording stylus, an endless belt carrying said stylus arranged and disposed to move the same over the recording paper in a direction transverse to the motion of the paper, means driving said belt at a desired rate, means for keying the transmitted signal at selected positions of the recording stylus with reference to the recording paper, said keying means being carried by said endless belt and an endless guide channel parallel to said belt and enclosed by the same for maintaining said stylus in a chosen position.

11. In a system of the echo type wherein depths or distances are measured by the time interval between the transmission of a signal and the receipt of the echo and recorded on a recording paper which is advanced uniformly in one direction, a recording stylus, an endless belt carrying said stylus mounted thereon arranged and disposed to move the same over the recording paper in a direction transverse to the motion of the paper, means driving said belt at a desired rate, means mounted on said belt for keying the transmitted signal at selected positions of the recording stylus with reference to the recording paper, a discharge visual indicating means positioned parallel to said endless belt and covered by the same, said endless belt having a window marking the indication of measurement relative to a scale, and scale means positioned beside the belt for indicating the depth.

12. In a system of the echo type wherein depths or distances are measured by the time interval between the transmission of a signal and the receipt of the echo, means for producing a permanent mark on a paper indicating the receipt of the echo including a stylus arranged to move across the paper, means providing a scale of depths to be printed on the paper, said means being divided into a plurality of scale sections each of which provides indicia embracing a different consecutive section of the total scaler depth range, means for selecting the section to be printed corresponding to a desired range of depths to be explored, and means for adjusting the time of production of the transmitted signal so that only echoes from the object lying in said desired range will return while said moving stylus means is disposed to mark the paper.

13. In a system of the echo type wherein depths or distances are measured by the time interval between the transmission of a signal and the receipt of the echo and recorded on a recording paper which is advanced uniformly in one direction, a recording stylus, an endless belt carrying said stylus arranged and disposed to move the same over the recording paper in a direction transverse to the motion of the paper, means driving said belt at a desired rate, means for keying the transmitted signal, said keying means being carried by said endless belt and an endless guide channel parallel to said belt and enclosed by the same for maintaining said stylus in a chosen position.

14. In a system of the echo type wherein depths or distances are measured by the time interval between the transmission of a signal and the receipt of the echo and recorded on a recording paper which is advanced uniformly in one direction, a recording stylus, an endless belt carrying said stylus arranged and disposed to move the same over the recording paper in a direction transverse to the motion of the paper, means driving said belt at a desired rate, means affixed to and carried by said belt for keying the transmitted signal, a discharge visual indicating means positioned parallel to said endless belt and covered by the same, said endless belt having a window marking the indication of measurement relative to a scale, and scale means positioned beside the belt for indicating the depth.

15. In a system of the echo type wherein depths or distances are measured by the time interval between the transmission of a signal and the receipt of the echo and recorded on a recording paper which is advanced uniformly in one direction, a recording stylus, an endless carrier for said stylus arranged and disposed to move the same over the recording paper in a direction transverse to the motion of the paper, means driving said carrier at a desired rate, and means mounted on said carrier for keying the transmitted signal.

16. In a system of the echo type wherein depths or distances are measured by the time interval between the transmission of a signal and the receipt of the echo and recorded on a recording paper which is advanced uniformly in one direction, a recording stylus, an endless carrier for said stylus arranged and disposed to move the same over the recording paper in a direction transverse to the motion of the paper, means driving said carrier at a desired rate, means on said carrier for keying the transmitted signal, a discharge visual indicating means positioned parallel to said endless carrier, a scale positioned beside the carrier for indicating the depth, and means on said carrier for marking the indication of said indicator relative to said scale.

17. In a system of the echo type wherein depths or distances are measured by the time interval between the transmission of a signal and the receipt of an echo and indicated by an element which is moved at a controlled rate with respect to a distance scale, means providing a plurality of distance scales corresponding to consecutive portions of said time interval, means to select one of said scales and to position the same parallel to the path of said element, and means to initiate the transmission of said signal at the beginning of said time interval regardless of the scale selected.

18. In a system of the echo type wherein depths or distances are measured by the time interval between the transmission of a signal and the receipt of an echo and indicated by an element which is moved at a controlled rate with respect to a distance scale, an endless belt, means affixing said element to said belt, means providing a purality of distance scales corresponding to consecutive portions of said time interval, means to select one of said scales and to position the same parallel to the path of said element, and means carried on said belt to initiate the transmission of said signal at the begining of said time interval regardless of the scale selected.

19. In a system of the echo type wherein depths or distances are measured by the time interval between the transmission of a signal and the receipt of an echo and recorded on a recording paper through the medium of a recording stylus moved over the paper, elongated means positioned parallel to the path of said stylus during recording, said elongated means bearing on successive elongated faces successive sections of a measuring scale, said sections corresponding to successive portions of said time interval, means employing said elongated means for periodically printing a desired scale section on the recording paper, and means adjusting the time of production of the transmitted signal to coincide at all times with the beginning of said time interval.

20. In a system of the echo type wherein depths or distances are measured by the time interval between the transmission of a signal and the receipt of an echo, an endless belt having a window therein, means to drive said belt at a desired rate, an elongated discharge visual indicator positioned adjacent said belt parallel to the path of said window, and means mounted on and carried by said belt for keying the transmitted signal.

21. In a system of the echo type wherein depths or distances are measured by the time interval between the transmission of a signal and the receipt of the echo and recorded on a record medium which is advanced in a prescribed direction, a recording instrument, an endless carrier for said instrument, arranged and disposed to move the same over the record medium in a direction transverse to said prescribed direction, means to drive said carrier at a desired rate, and elongated means disposed parallel to the path of said carrier over said medium and adjacent to said carrier, and arranged to engage said carrier for guiding said recording instrument in a prescribed path as it traverses said record medium, said guiding means extending throughout and defining the direction of said path.

22. In a system of the echo type wherein depths or distances are measured by the time interval between the transmission of a signal and the receipt of the echo and recorded on a record medium which is advanced in a prescribed direction, a recording instrument, an endless carrier for said instrument, arranged and disposed to move the same over the record medium in a direction transverse to said prescribed direction, means to drive said carrier at a desired rate, means disposed adjacent to said carrier for guiding said recording instrument in a prescribed path as it traverses said record medium, said guiding means extending throughout and defining the direction of said path, and means mounted on said carrier for keying the transmitted signal.

23. In a system of the echo type wherein depths or distances are measured by the time interval between the transmission of a signal and the receipt of the echo and recorded on a record medium which is advanced in a prescribed direction, a recording instrument, an endless carrier for said instrument, arranged and disposed to move the same over the record medium in a direction transverse to said prescribed direction, said instrument being fixedly mounted on said carrier, means to drive said carrier at a desired rate, and means mounted on said carrier in fixed relation with respect to said recording instrument for keying the transmitted signal.

24. In a system of the echo type wherein depths or distances are measured by the time interval between the transmission of a signal and the receipt of the echo and recorded on a record medium, a record medium, a platform whereon said medium rests, signal transmission means supported from said platform adjacent said medium, medium marking means, an endless belt on which said marking means is mounted disposed adjacent said medium and means to drive said belt to carry said marking means across said medium in marking relation, means to bring a received signal to said marking means, and means fixed directly to said marking means to actuate said signal transmission means.

25. In a system of the echo type wherein distances or depths are measured by the time interval between the transmission of a signal and the receipt of an echo and recorded on a record medium, means providing a record medium, signal transmission means fixedly positioned adjacent said medium, an elongated flexible body, means hingedly joining the two ends of said body to form an endless belt, a medium-marking stylus and an actuator for said signal transmission means both mounted on said joining means, and pulley means adjacent said medium for holding said belt and moving said stylus over said medium to mark said medium and carrying said actuator into cooperative relation with said signal transmission means.

26. In a system of the echo type wherein distances or depths are measured by the time interval between the transmission of a signal and the receipt of an echo and recorded on a record medium, means providing a record medium, signal transmission means fixedly positioned adjacent said medium, an endless belt, unitary means holding a medium-marking stylus and an actuator for said signal transmission means in fixed mutual relation, means mounting said unitary means on said belt, and pulley means adjacent said medium for holding said belt and moving said stylus over said medium to mark the same and carrying said actuator into cooperative relation with said signal transmission means.

27. In a system of the echo type wherein distances or depths are measured by the time interval between the transmission of a signal and the receipt of the echo, recorder apparatus which records said interval on a record medium by a marking instrument which is drawn across said medium, pulley wheels which are mounted at opposite sides of the recording medium, an endless belt guided over said pulley wheels, a carrier attached to said endless belt, a marking instrument mounted on said carrier, and means for keying the transmitted signal mounted on said carrier.

EZEKIEL WOLF.

(References on following page)

REFERENCES CITED

The following references are of record in the file of this patent:

UNITED STATES PATENTS

| Number | Name | Date |
|---|---|---|
| 1,088,129 | Cone | Feb. 24, 1914 |
| 1,451,900 | Diegel | Apr. 17, 1923 |
| 1,732,718 | Gluer | Oct. 22, 1929 |
| 2,154,066 | De Giers | Apr. 11, 1939 |
| 2,326,880 | Norrman | Aug. 17, 1943 |
| 2,339,588 | Sproule | Jan. 18, 1944 |
| 2,350,994 | Anderson | June 13, 1944 |
| 2,355,502 | Barton | Aug. 8, 1944 |
| 2,361,703 | Orlich et al. | Oct. 31, 1944 |
| 2,394,286 | Blaisdell | Feb. 5, 1946 |
| 2,397,038 | Obenshain et al. | Mar. 19, 1946 |
| 2,397,175 | White | Mar. 26, 1946 |
| 2,407,330 | Turner, Jr. | Sept. 10, 1946 |
| 2,410,835 | Montague | Nov. 12, 1946 |
| 2,421,834 | Crowther | June 10, 1947 |
| 2,463,328 | Sproule | Mar. 1, 1949 |
| 2,505,587 | Smith | Apr. 25, 1950 |